(12) United States Patent
Rosman et al.

(10) Patent No.: US 10,882,522 B2
(45) Date of Patent: Jan. 5, 2021

(54) SYSTEMS AND METHODS FOR AGENT TRACKING

(71) Applicant: Toyota Research Institute, Inc., Los Altos, CA (US)

(72) Inventors: Guy Rosman, Newton, MA (US); Jonathan DeCastro, Arlington, MA (US); Nikos Arechiga Gonzalez, San Mateo, CA (US); John Joseph Leonard, Newton, MA (US); Luke S. Fletcher, Cambridge, MA (US); Daniel Stonier, Lexington, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 137 days.

(21) Appl. No.: 16/130,458

(22) Filed: Sep. 13, 2018

(65) Prior Publication Data

US 2020/0086863 A1    Mar. 19, 2020

(51) Int. Cl.
| | |
|---|---|
| *B60W 30/095* | (2012.01) |
| *B60W 30/09* | (2012.01) |
| *G06K 9/00* | (2006.01) |
| *G05D 1/00* | (2006.01) |
| *G06N 7/00* | (2006.01) |

(52) U.S. Cl.
CPC ........ *B60W 30/0956* (2013.01); *B60W 30/09* (2013.01); *G05D 1/0088* (2013.01); *G06K 9/00805* (2013.01); *G06N 7/005* (2013.01)

(58) Field of Classification Search
CPC .................................................. B60W 30/0956
USPC ......................................................... 701/23
See application file for complete search history.

(56) References Cited

U.S. PATENT DOCUMENTS

| | | | |
|---|---|---|---|
| 7,966,276 B2 | 6/2011 | Cade | |
| 8,478,642 B2 * | 7/2013 | Dey | .................... G01C 21/3484 |
| | | | 705/14.4 |

(Continued)

OTHER PUBLICATIONS

Karasev et al., "Intent-Aware Long-Term Prediction of Pedestrian Motion," 2016 IEEE International Conference on Robotics and Automation (ICRA), 2543-2549 (2016).

(Continued)

*Primary Examiner* — Jason C Olson
(74) *Attorney, Agent, or Firm* — Christopher G. Darrow; Darrow Mustafa PC

(57) ABSTRACT

System, methods, and other embodiments described herein relate to modeling dynamic agents in a surrounding environment of an ego vehicle. In one embodiment, a method includes, in response to receiving sensor data including present observations of a road agent of the dynamic agents in the surrounding environment, identifying previous observations of the road agent from an electronic data store. The method includes estimating a future state of the road agent using at least the present observations and the previous observations of the road agent to compute the future state according to a probabilistic model comprised of a transition model that accounts for dynamic behaviors of the road agent to characterize transitions between states, and an agent model that accounts for actions of the road agent. The method includes controlling one or more vehicle systems of the ego vehicle according to the future state of the road agent.

20 Claims, 7 Drawing Sheets

(56) References Cited

U.S. PATENT DOCUMENTS

| | | | |
|---|---|---|---|
| 9,015,092 B2* | 4/2015 | Sinyavskiy | G06N 20/00 |
| | | | 706/25 |
| 9,404,761 B2 | 8/2016 | Meuleau | |
| 9,619,561 B2* | 4/2017 | Chrysanthakopoulos | ............... |
| | | | G06F 16/7837 |
| 10,196,058 B2* | 2/2019 | Paris | B60W 30/18154 |
| 2009/0299496 A1* | 12/2009 | Cade | G05B 17/02 |
| | | | 700/29 |
| 2011/0231016 A1* | 9/2011 | Goulding | G01C 21/20 |
| | | | 700/246 |
| 2017/0297576 A1 | 10/2017 | Hader et al. | |
| 2018/0012137 A1 | 1/2018 | Wright et al. | |
| 2018/0032082 A1* | 2/2018 | Shalev-Shwartz | ............... |
| | | | G05D 1/0088 |
| 2018/0141544 A1* | 5/2018 | Xiao | B60W 30/095 |
| 2018/0151073 A1* | 5/2018 | Minemura | B60T 7/22 |
| 2018/0233047 A1* | 8/2018 | Mandeville-Clarke | ............... |
| | | | B62D 15/025 |
| 2018/0284774 A1* | 10/2018 | Kawamoto | G01C 21/26 |
| 2018/0314921 A1* | 11/2018 | Mercep | G01S 13/87 |
| 2019/0042859 A1* | 2/2019 | Schubert | B60K 31/0008 |
| 2019/0049968 A1* | 2/2019 | Dean | B60W 30/0956 |
| 2019/0227553 A1* | 7/2019 | Kentley-Klay | G05D 1/0088 |
| 2019/0355257 A1* | 11/2019 | Caldwell | G08G 1/166 |
| 2019/0389459 A1* | 12/2019 | Berntorp | G08G 1/167 |

OTHER PUBLICATIONS

Brechtel et al., "Learning Context Sensitive Behavior Models from Observations for Predicting Traffic Situations," Karlsruhe Institute of Technology (2013).

Kuefler, et al. Imitating driver Behavior with Generative Adversarial Networks. arXiv preprint arXiv:1701.06699, 2017.

Shalev-Shwartz, et al. On a Formal Model of Safe and Scalable Self-driving Cars. arXiv preprint arXiv:1708.06374, 2017.

Ho, et al. Generative Adversarial Imitation Learning. In Advances in Neural Information Processing Systems, pp. 4565-4573, 2016.

Brechtel, et al. Probabilistic mdp-behavior planning for cars. In Intelligent Transportation Systems (ITSC), 2011 14th International IEEE Conference on, pp. 1537-1542. IEEE, 2011.

Henry, et al. Learning to navigate through crowded environments. In IEEE Intl. Conf. on Robotics and Automation (ICRA), pp. 981-986. IEEE, 2010.

Ma, et al. Forecasting interactive dynamics of pedestrians with fictitious play. In Proc. IEEE Int. Conf. Computer Vision and Pattern Recognition, pp. 774-782, 2017.

* cited by examiner

SYSTEMS AND METHODS FOR AGENT TRACKING

TECHNICAL FIELD

The subject matter described herein relates, in general, to systems and methods for modeling behaviors of agents in a surrounding environment, and, in particular, to predicting behaviors of the agents including behaviors relating to the presence of unseen agents from observed states.

BACKGROUND

Machine perception and understanding of a surrounding environment through the use of electronic information can represent a difficult task. For example, machines (e.g., robots, autonomous vehicles, etc.) generally use electronic sensors such as cameras, LiDAR, and other sensors to acquire the electronic information about the surrounding environment. The information can take different forms such as still images, video, point clouds, radar data, and so on. However, understanding the contents of the information and behaviors of associated objects represented therein from the electronic information can be a complex task. That is, in general, to autonomously or at least semi-autonomously navigate through the surrounding environment, a machine estimates the state of the surrounding environment including dynamic objects (e.g., other vehicles, pedestrians, etc.) that are moving in relation to the machine. The surrounding environment represents a complex system of static and dynamic objects, and thus generating accurate estimations of the various situations (e.g., traffic situations) can be difficult.

The complexity of the surrounding environment is embodied by the continuous, dynamic, and partially observable aspects of the environment. That is, the provided sensors of the machine, even when provided in a robust configuration of many high-quality sensors do not provide complete observations of the surroundings due to occlusions and other intrinsic characteristics of the environment that hinder acquiring a complete observation. Moreover, errors from intrinsic and extrinsic circumstances associated with the sensors acquiring the electronic information can introduce further difficulties into estimating states for aspects of the environment, especially when considering the continuous manner of data acquisition and dynamics of objects in the environment. These noted aspects in combination with estimating behaviors that depend on contextual elements of the surrounding environment including aspects that are unseen or only partially observed present difficulties for generating accurate estimates of the state from which the machine determines how to autonomously navigate or otherwise control movements in the environment.

SUMMARY

In one embodiment, example systems and methods relate to a manner of estimating behaviors of agents in a surrounding environment that leverages various sources of information to learn the behaviors and produce predictions therefrom. Thus, the disclosed approach implements a model that, in one embodiment, is employed for tracking and predicting aspects of the road agents including improving on such determinations for partial/noisy observations including latent aspects of the environment. In this way, the prediction system improves the functioning of vehicle systems (e.g., autonomous systems, advanced driver assistance systems) that rely on accurate predictions of aspects in the surrounding environment.

In one embodiment, a prediction system for modeling dynamic agents in a surrounding environment of an ego vehicle is disclosed. The prediction system includes one or more processors and a memory communicably coupled to the one or more processors. The memory stores an input module including instructions that when executed by the one or more processors cause the one or more processors to, in response to receiving sensor data including present observations of a road agent of the dynamic agents that are being tracked in the surrounding environment, identify previous observations of the road agent from an electronic data store. The memory stores a tracking module including instructions that when executed by the one or more processors cause the one or more processors to estimate a future state of the road agent using at least the present observations and the previous observations of the road agent to compute the future state according to a probabilistic model that is comprised of a transition model that accounts for dynamic behaviors of the road agent to characterize transitions between states, and an agent model that accounts for actions of the road agent. The present observations indicate at least a partial observation of the road agent. The tracking module includes instructions to control one or more vehicle systems of the ego vehicle according to the future state of the road agent.

In one embodiment, a non-transitory computer-readable medium for modeling dynamic agents in a surrounding environment of an ego vehicle and including instructions that when executed by one or more processors cause the one or more processors to perform one or more functions. The instructions include instructions to, in response to receiving sensor data including present observations of a road agent of the dynamic agents that are being tracked in the surrounding environment, identify previous observations of the road agent from an electronic data store. The instruction include instructions to estimate a future state of the road agent using at least the present observations and the previous observations of the road agent to compute the future state according to a probabilistic model that is comprised of a transition model that accounts for dynamic behaviors of the road agent to characterize transitions between states, and an agent model that accounts for actions of the road agent. The present observations indicate at least a partial observation of the road agent. The instruction include instructions to control one or more vehicle systems of the ego vehicle according to the future state of the road agent.

In one embodiment, a method for modeling dynamic agents in a surrounding environment of an ego vehicle is disclosed. In one embodiment, the method includes, in response to receiving sensor data including present observations of a road agent of the dynamic agents that are being tracked in the surrounding environment, identifying previous observations of the road agent from an electronic data store. The method includes estimating a future state of the road agent using at least the present observations and the previous observations of the road agent to compute the future state according to a probabilistic model that is comprised of a transition model that accounts for dynamic behaviors of the road agent to characterize transitions between states, and an agent model that accounts for actions of the road agent. The present observations indicate at least a partial observation of the road agent. The method includes controlling one or more vehicle systems of the ego vehicle according to the future state of the road agent.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a framework for modeling road agent behaviors including latent aspects affecting the road agent are disclosed. As mentioned previously, a vehicle may include multiple sensors for perceiving aspects of the surrounding environment. Moreover, autonomous driving systems, advanced driver assistance systems, or other systems within the vehicle process sensor data from the sensors to perceive aspects of the surrounding environment. However, in general, accurately processing the sensor data to determine behaviors of surrounding road agents can be a complex task especially in relation to latent aspects that are unobserved or only partially observed.

Therefore, in one embodiment, a prediction system and associated methods as disclosed herein provide for a robust approach to modeling behaviors of the road agents that improve predictions generated therefrom through the use of various data sources (e.g., logged and/or simulated) to train the model along with the ability to include modeling of latent features such that behaviors of the road agents can be better understood. Consequently, the associated determinations resulting from the model improve predictions of the dynamics within the surrounding environment thereby permitting the prediction system to improve upon control (e.g., autonomous control) and decision making for the vehicle. In this way, the vehicle improves autonomous operations through an unconventional approach to computing the predicted dynamic behaviors of the road agents.

Figure 1:
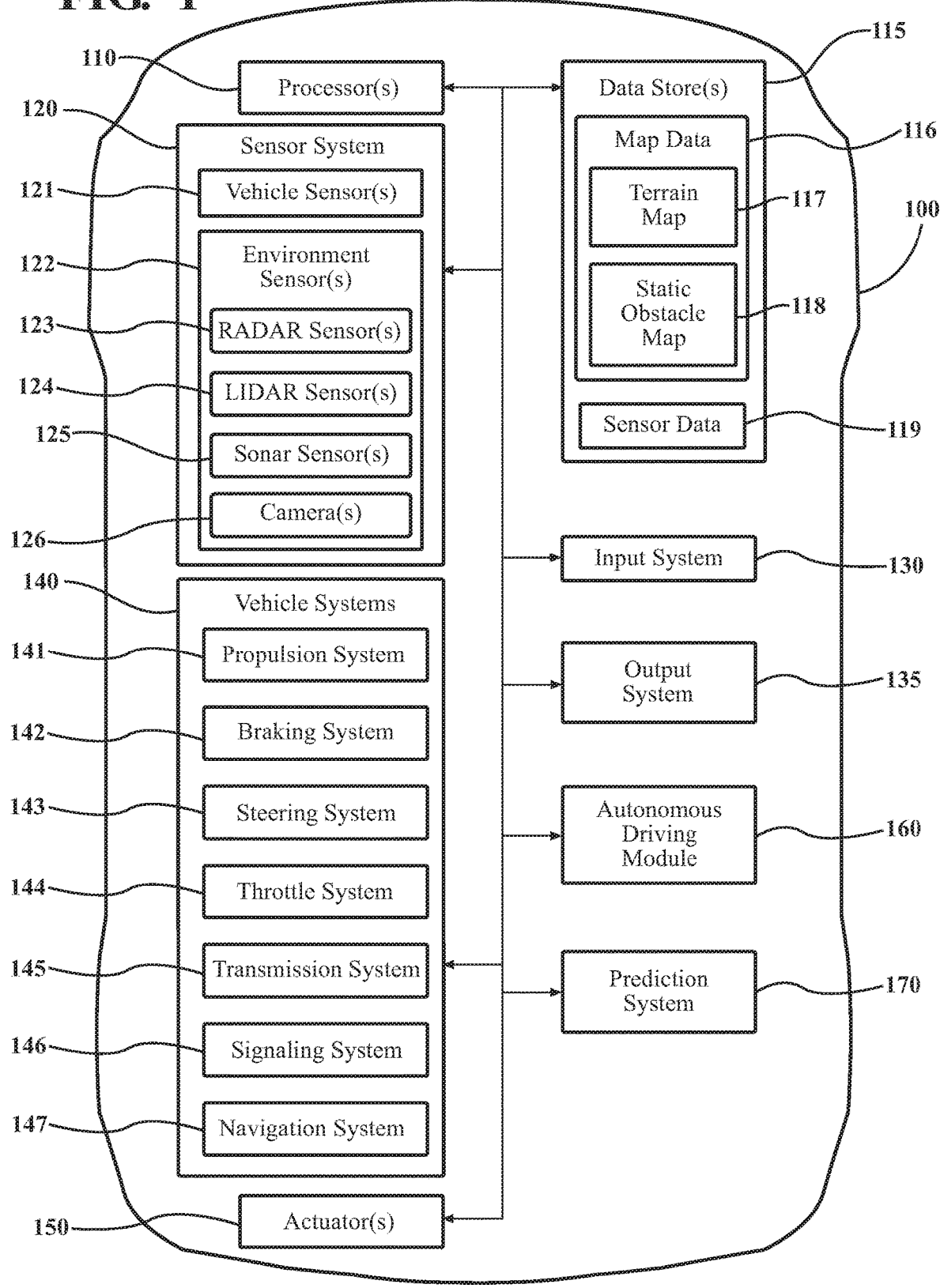
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and generates predictions therefrom to influence control of the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a prediction system 170 that is implemented to perform methods and other functions as disclosed herein relating to training and implementing predictive models associated with estimating dynamic behaviors (e.g., likely movements and actions) of road agents. The noted functions and methods will become more apparent with a further discussion of the figures.

Figure 2:
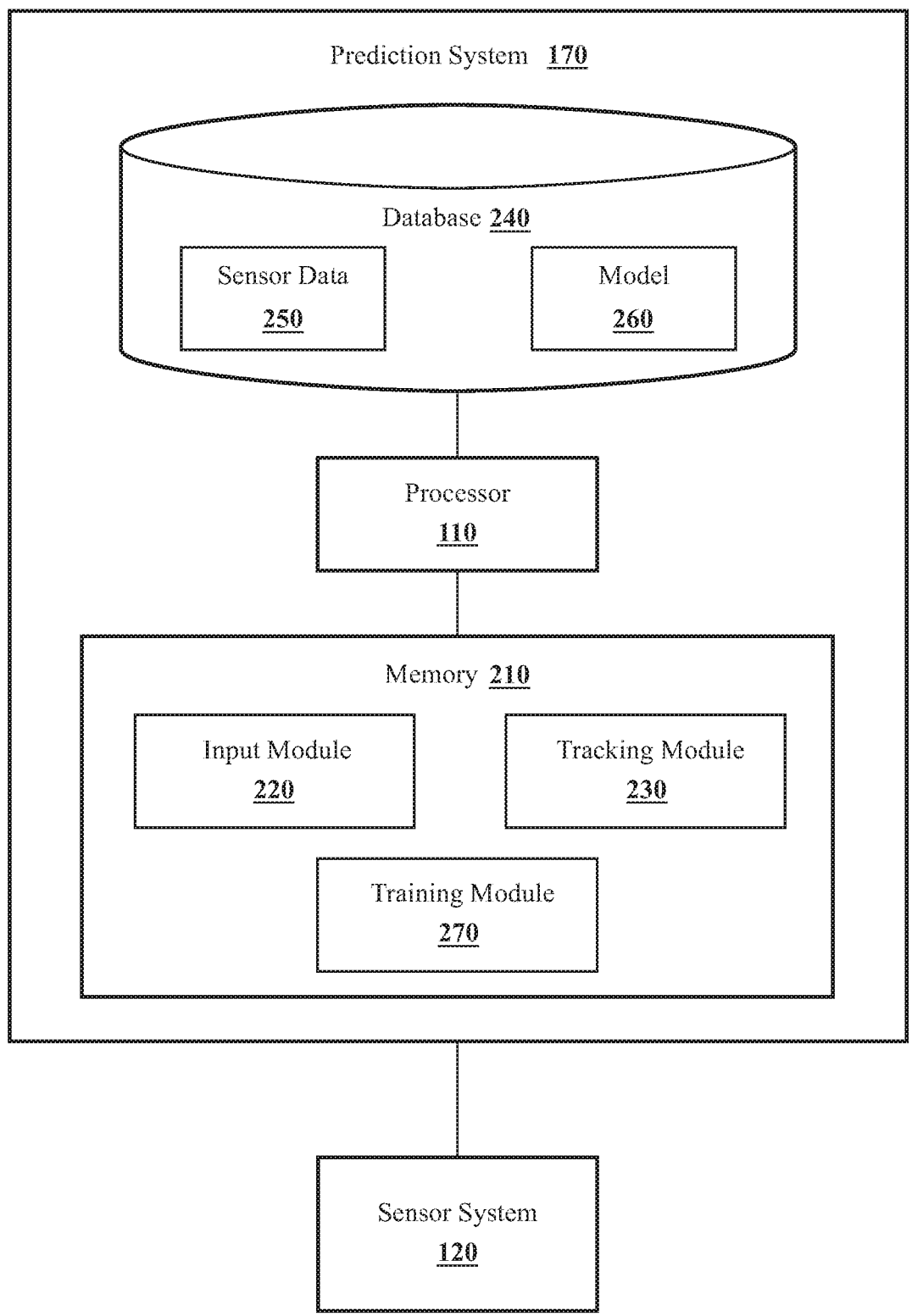
FIG. 2 illustrates one embodiment of a prediction system that is associated with training a model and using the model to track road agents in a surrounding environment.

With reference to FIG. 2, one embodiment of the prediction system 170 of FIG. 1 is further illustrated. The prediction system 170 is shown as including a processor 110 from the vehicle 100 of FIG. 1. Accordingly, the processor 110 may be a part of the prediction system 170, the prediction system 170 may include a separate processor from the processor 110 of the vehicle 100 or the prediction system 170 may access the processor 110 through a data bus or another communication path. In one embodiment, the prediction system 170 includes a memory 210 that stores an input module 220, a tracking module 230, and a training module 270. The memory 210 is a random-access memory (RAM), read-only memory (ROM), a hard-disk drive, a flash memory, or other suitable memory for storing the modules 220, 230, and 270. The modules 220, 230, and 270 are, for example, computer-readable instructions that when executed by the processor 110 cause the processor 110 to perform the various functions disclosed herein. It should be noted that while the modules 220, 230, and 270 are illustrated together within the memory 210, in various embodiments, the modules 220, 230, and 270 are distributed within a cloud-computing environment and remote from the vehicle 100. Thus, one or more of the functions (e.g., training) discussed in relation to the various modules 220, 230, and 270, in one embodiment, are performed off-board of the vehicle 100 while further functions (e.g., prediction of future states) are performed onboard.

Accordingly, the input module 220 generally includes instructions that function to control the processor 110 to receive data inputs from sensors of the vehicle 100. In one embodiment, the input module 220 controls the respective sensors of the sensor system 120 to provide the data inputs in the form of sensor data 250. As an additional note, while the input module 220 is generally discussed as controlling the various sensors to provide the sensor data 250, in one or more embodiments, the input module 220 can employ other techniques to acquire the sensor data 250 that are either active or passive. For example, the input module 220 may passively sniff the sensor data 250 from a stream of electronic information provided by the various sensors to further components within the vehicle 100. The sensor data 250 is, in one embodiment, scan data that embodies observations of a surrounding environment of the vehicle 100. In general, as provided for herein, the input module 220 receives the sensor data 250 from the respective sensors and can either immediately pass the sensor data to the tracking module 230 and/or the training module 270 or store the sensor data 250 for subsequent use in an electronic data store.

Furthermore, in one embodiment, the prediction system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 230, and 270 in executing various functions. In one embodiment, the database 240 includes the sensor data 250 along with, for example, other information that is used by the modules 220, 230, and 270 such as previously logged observations of road agents in the surrounding environment, previously estimated future states, previously observed states, previously estimated future actions, previously observed actions, previously estimated observations, and so on.

The sensor data 250 can include 3D point cloud data, camera images and/or video from the camera 126 along with metadata describing extrinsic aspects related to the data (e.g., time of collection, location, etc.). In further embodiments, the sensor data 250 includes information from further sensors such as an IMU, a radar 123, sonar 125, and so on. As a general matter, the prediction system 170 can use various combinations of the sensor data 250 to perform the noted functions. However, in one embodiment, the sensor data 250 is generally provided with sufficient information to at least indicate positions and trajectories of perceived agents such that further determinations can be determined therefrom.

In addition to the noted sensor data 250, in one embodiment, the database 240 also stores simulated data. The simulated data is, for example, computer-generated to approximate actual perceptions and circumstances that may be encountered by the vehicle 100. Accordingly, the simulated data may be generated in the form of raw sensor data and/or observations derived from sensor data by perception modules of the vehicle 100. In either case, the simulated data is provided as a further mechanism for training model 260 as will be discussed further subsequently.

As indicated, the database 240 also includes, in one embodiment, the model 260. The model 260 is, in one embodiment, a probabilistic model that is based, at least in part, on a Markov decision process or partially-observable Markov Decision Process (MDP/POMDP). While the model 260 is generally discussed as an MDP or POMDP, it should be appreciated that the model 260 can be implemented in other forms but is discussed in relation to one option for purposes of brevity. For example, in further examples, the model 260 is a generative adversarial imitation learning (GAIL) model, a guided cost learning-inverse reinforcement learning (GCL-IRL) model, a recurrent neural network (RNN), a Long short-term memory model(s), variational neural networks, or another suitable deep learning model. Moreover, the model 260 includes, in one or more arrangements, further sub-models such as an agent model and a transition model. In one embodiment, the transition model accounts for dynamic behaviors of the road agent to characterize transitions between states while the agent model accounts for actions of the road agent. Further aspects of the model 260 will be discussed subsequently in relation to FIG. 3. However, it should be appreciated that the model 260 is provided as a mechanism for learning dynamic behaviors of road agents that can then be applied to predict future states using at least present observations and thereby improve understanding of the surrounding environment from which the prediction system 170 facilitates improved autonomous control of the vehicle 100 as a result thereof.

As a further matter, the present disclosure generally refers to agents using phrases such as road agents, dynamic agents, latent agents, and similar notations. Accordingly, it should be appreciated that the noted phrases relating to agents all generally refer to dynamic aspects of the surrounding environment and also aspects that influence movements of the dynamic aspects. Thus, the agents include, in one embodiment, vehicles, pedestrians (e.g., children bouncing balls), objects, traffic lights, traffic signs, animals (e.g., dogs), and so on. Therefore, reference to agents in different forms is intended to be generally inclusive.

Continuing with FIG. 2 and the input module 220, in one embodiment, the input module 220 is further configured to perform additional tasks beyond controlling the respective sensors to acquire and provide the sensor data 250. For example, the input module 220 analyzes the sensor data 250 in order to generate abstracted perceptions therefrom such as identifying objects/agents and associated characteristics (e.g., trajectories, etc.). In one embodiment, the input module 220 generates semantic labels for a camera image to identify represented objects which may then be correlated to point cloud data, radar data, and other acquired information to generate positions, trajectories, and other characteristics.

As such, in one or more embodiments, the input module 220 includes a machine learning algorithm such as a neural network (e.g., convolutional neural network) that processes the sensor data 250 to provide the observations. In further implementations, the input module 220 implements different approaches for performing the recognition techniques which can include various forms of machine learning or other suitable approaches. Whichever particular approach the input module 220 implements, the input module 220 provides the determinations about observed agents to the tracking module 230 for subsequent analysis and/or logs the observations in the database 240 for subsequent learning. In further aspects, the input module 220 may identify and provide known information about a road agent when the road agent is detected within present observations of the surrounding environment. For example, when the prediction system 170 is tracking a road agent and the input module 220 detects the road agent within the sensor data 250, the input module 220 may then load previous observations into the memory 210 so that the previous observations are available to the tracking module 230 to perform further estimations of future states. In this way, the input module 220 manages electronic information for the prediction system 170 to improve data handling and efficiencies within the system 170.

Turning to the estimations of state for dynamic agents in the surrounding environment, the discussion will now focus on the tracking module 230 and the model 260. Accordingly, the graph 300 of FIG. 3 will be referenced in combination with the discussion of the tracking module 230 in order to provide a visual reference for the subsequent discussion. In one embodiment, the tracking module 230 generally includes instructions that function to control the processor 110 to estimate a future state of a road agent using at least present observations and previous observations of the road agent. Thus, the tracking module 230 uses the noted electronic information in combination with the model 260 to compute the future state. Thereafter, the tracking module 230 can control one or more of the vehicle systems 140 according to the future state of the road agent. For example, the tracking module 230 in combination with the autonomous driving module 160 identify, plan, and execute maneuvers of the vehicle 100 in relation to the determined future state of the road agent.

In either case, the tracking module 230 employs the model 260 to produce the estimation of the future state. In one embodiment, the model 260 is a Markov Decision Process (MDP) or other suitable model as previously indicated that describes a predicted value of each action a E A given state s E S in terms of possible future rewards. The model 260 further includes a transition function/model T:S×A→S that explains possible future states when provided a state and an action. Moreover, a reward function R: S×A→R describes a reward associated with taking action "a" when a current state is "s." In one embodiment, the model 260 is implemented according to principals of reinforcement learning to take reward structure into account, and explain behaviors of dynamic agents. As such, the Q-function, as indicated within the graph 300 of FIG. 3, describes future expected rewards, given that the road agent chose to take action "a" while in state "s," where Q(s, a). Q may be represented according to: equation [1].

$$Q(s,a) = w^T \varphi(s,a) \quad [1]$$

However, as previously indicated, agents are often only partially observed, which partial observations can differ between instances of agents. Yet the same model still estimates the behaviors even though the observations are from different viewpoints. To simplify notation, assume that $\varphi(s, a)$ is partially observed in the form of observations z, and that z includes all information observable on s, a according to acquired sensor data 250. The task of estimating agent state "s" can be written as estimating a latent Markov model with latent terms $(s^t, a^t)$, and structure:

$$p(z^t, s^t, a^t | s^{t-1}, a^{t-1}) = p(s^t, a^t | s^{t-1}, a^{t-1}) p(z^t | s^t, a^t) \quad [2]$$

where s, a are the state and action, and z denotes the observations obtained for the road agent state and actions.

$$p(a^t | s^t) \propto \exp\{Q(s^t, a^t)\} = \exp\{w^T \varphi(s^t, a^t)\}. \quad [3]$$

Coupled with a transition probability $T(s^{t-1}, a^{t-1}, s^t) = p(s^t | s^{t-1}, a^{t-1})$, this creates a hidden Markov model, with $S_t, A_t$ defining the Markov state for time t, conditioned on the latent variable Q, with transition probabilities:

$$p(s^t, a^t | s^{t-1}, a^{t-1}) = p(s^t | a^{t-1}, s^{t-1}) p(a^t | s^t) \propto T(s^t, a^{t-1}, s^{t-1})$$
$$\exp\{Q(s^t, a^t)\} = T(s^t, a^{t-1}, s^{t-1}) \exp\{w^T \varphi(s^t, a^t)\}. \quad [4]$$

Here T denotes the transition model $p(s^t, a^t | s^{t-1}, a^{t-1})$ in reinforcement learning notation. In terms of observations and latent variables, $\varphi$ is now also a latent variable, possibly observed via Z. Incorporating the above into Equation 4 results in:

$$p(z^t, s^t, a^t | s^{t-1}, a^{t-1}, T, Q) = T(s^t, s^{t-1}, a^{t-1}) p(a^t | s^t, T, Q) p(z^t | s^t, a^t), \quad (5)$$

Figure 3:
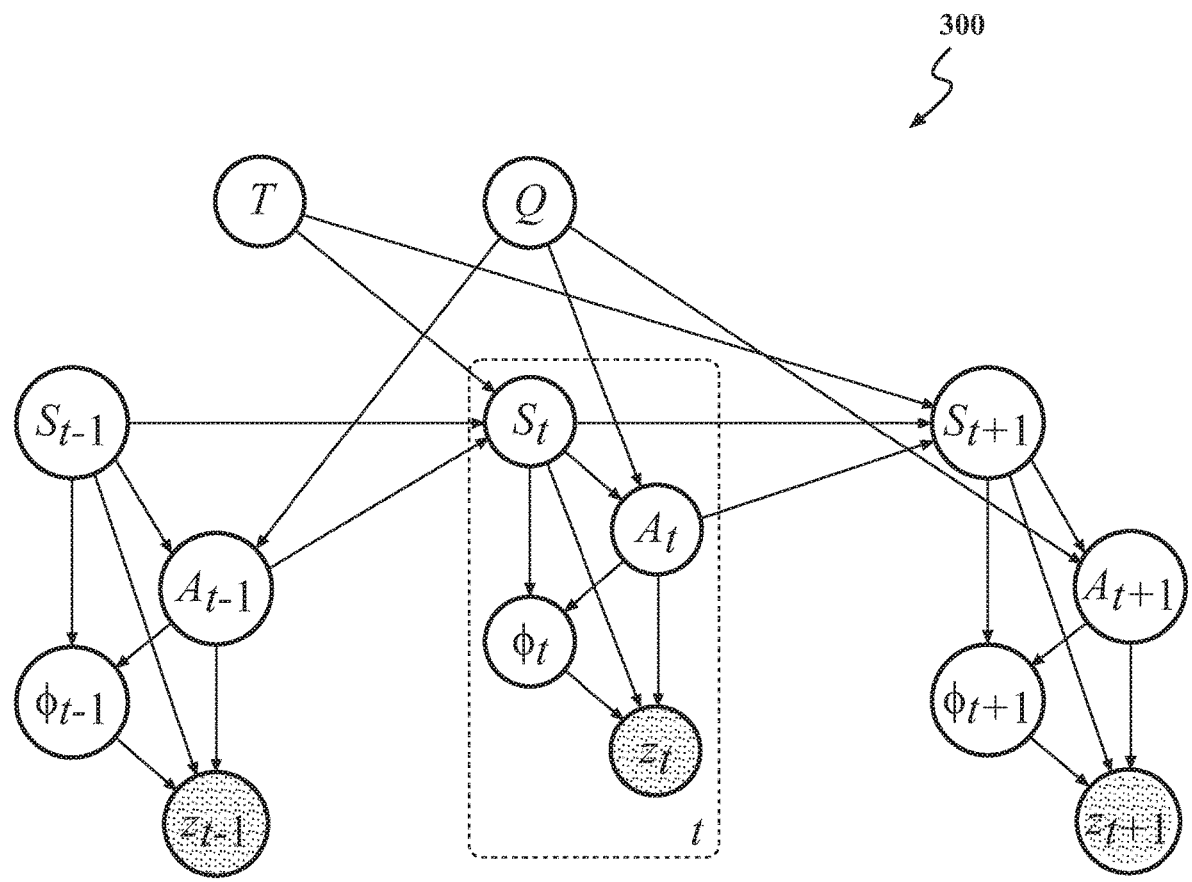
FIG. 3 illustrates a graph representation of the model for tracking road agents.

The graphical representation 300 illustrated in FIG. 3 corresponds to the model 260. Specifically, the model 260 allows, for example, estimating $s^t$, $a^t$ given a belief on $s^{t-1}$, $a^{t-1}$ and $z^t$ via Bayes' rule.

$$p(s^t, a^t | z^t, s^{t-1}, a^{t-1}, T, Q) = p(z^t, s^t, a^t | s^{t-1}, a^{t-1}, T, Q) / p(z^t | s^{t-1}, a^{t-1}, T, Q) \quad (6)$$

Note that $\varphi(s, a)$ is a deterministic function. While $\varphi$ appears in the graphical model of FIG. 3 to make p(z|s, a) more explicit, $\varphi$ is marginalized when actually describing the probabilities. By way of example, the model 260 can be implemented using a Gaussian-linear dynamics model, where S—is the state and includes location/dynamics, A is a single possible action such as move forward, maintain present speed, and so on. Additionally, Z represents observations (e.g., information derived from the sensor data 250 as presently acquired). The features include location and orientation, but, in one embodiment, only the location is observed. An example distribution of Z can include $Z_t \sim N(\text{proj}_c(S_t), \Sigma)$, where $\text{proj}_c(S_t)$ is a camera projection of the location specified by $S_t$, and $\Sigma$ is a 2D tracker location covariance.

As a further example of an implementation of the model 260, consider a circumstance where the model 260 is trained to track the steering of a vehicle. In such an example, S (i.e., state) represents the location/dynamics of the vehicle, A, the action, represents the steering/tracking w/car dynamics. Additionally, $\varphi$ is the pose and velocity of the vehicle at an intended waypoint. In the present example, Z represents location observations. Accordingly, the Q function (i.e., agent model) encapsulates desire to get a discrete valid waypoint in an intersection. The transition function/model T incorporates a chance of a new waypoint into the model 260.

In a further example, the model 260 as implemented via the tracking module 230 provides for tracking a car with road semantics. For example, S represents a location and dynamics, waypoint. The action A represents steering. Here, $\varphi$ embodies lane information of the vehicle (e.g., vehicle 100) a nearby vehicle (cars that are external to the agent being tracked) location in car coordinate frame. Z represents sensor data 250 associated location observations and semantic map values at the estimated locations, S—location/dynamics, A—steering, T—dynamics in car's coordinate frame+update of waypoint.

These examples demonstrate how the model 260 incorporates improved scene understanding from vision and other sensors that account for contextual and latent aspects of the surrounding environment. To emphasize: $\varphi$ is latent, Z are observable quantities. However, the observations Z are not always available, for example when observing an agent (e.g., nearby vehicle) complete knowledge of the viewpoint from the nearby vehicle is unknown. Instead, the vehicle 100 makes observations from a separate position that is in relation to the nearby vehicle. Thus, the vehicle 100 cannot produce observations that wholly encompass knowledge of the nearby vehicle and perceptions of the nearby vehicle. This is generally because aspects of the surrounding environment occlude portions of the field-of-view for the vehicle 100 thereby precluding observations of what may be known by the nearby vehicle. In some cases, $\varphi$ may have a closed form expression given S, Z, for example, if $\varphi(S)$, $Z(\varphi)$ follows a Gaussian observation model.

In one embodiment, the Q function provides a prior for tracking beyond the dynamics of the environment. In general, this is equivalent to forward filtering estimates for $S_t$, $A_t$, conditioned on Q and given the observations, as shown in Equation 4. The following algorithm represents one approach to implementing the model 260 by the tracking module 230 to perform forward estimation of states. For example, the tracking module 230 conditions $S_t$, $A_t$, on Q given the observations (previous and current), as shown in Equation 4 using the model 260. For example, the tracking module 230 implements the following algorithm for state estimation according to noisy observations.

```
1: for Time t = 1, 2, ... do
2:    Update belief of s_t, a_t using sequential Monte-Carlo, based on
      Equation 6 (e.g., Metropolis-Hastings)
3: end for
```

More precisely, in one embodiment, the model 260 is implemented via the tracking module 230 according to: $P(s_t|o_1 \ldots o_t)$, $P_Q(a_t|s_t)$, $P_T(s_{t+1}|a_t, s_t)$, to compute a future/predicted state distribution given past and current observations such that:

$$P(s_{t+1}|o_1, \ldots, o_t) : P(s_{t+1}|o_1, \ldots, o_t) = \int P_Q(a_t|s_t) P_T(s_{t+1}|a_t, s_t) \quad [7]$$

Subsequently, the tracking module 230 can apply the model 260 to update the future state according to $P(o_{t+1}|s_{t+1})$ by Bayes' rule to get the corrected posterior $P(s_{t+1}|o_1 \ldots o_{t+1}) \propto P(s_{t+1}|o_1 \ldots o_t) P(o_{t+1}|s_{t+1})$. This update provides, in one embodiment, a prediction of a new/future state when provided a previous state and observations (e.g., past observations and present observations). In one embodiment, the tracking module 230 uses sequential monte carlo techniques to generate the prediction. Furthermore, the tracking module 230 can implement a similar approach for state and action distributions.

Accordingly, the tracking module 230 can use the trained model 260 to predict future states and actions associated with a road agent for which, for example, only partial observations are available. In this way, the tracking module 230 leverages the model 260 to improve predictions about the road agents, which then influence, in an improved manner, how the prediction system 170 affects autonomous control of the vehicle 100. This improvement flows from improved knowledge of the road agents and thus a better ability to account for movements of the road/dynamic agents. Accordingly, through the unconventional arrangement of relationships and indicated computations, the tracking module 230 in combination with the model 260 improve tracking/prediction of dynamic behaviors for the road agents, which are realized through improved planning and control for the vehicle 100.

Moreover, the model 260 is generally imparted with this ability through training the model 260 on the particular circumstances. Thus, in one embodiment, the training module 270 uses real sensor data 250 and/or simulated data that includes at least various time-step observations of a road agent to train the model 260.

For example, learning about dynamic agents from observations generally includes using observations and a prior for Q, to determine a more accurate estimate for Q. In one approach, learning in this manner is a variant of the Baum-Welch algorithm, where the update on Q involves inverse reinforcement learning or imitation learning. Note that given samples of $S_t$, $A_t$, the training module 270 updates the terms that involve Q, which guarantees convergence (at least locally).

For example, in one approach, the training module 270 uses $P(s_t|o_t \ldots o_M)$, $P_Q(a_{t-1}|s_{t-1})$, $P_T(s_t|a_{t-1}, s_{t-1})$, and computes $P(s_{t-1}|o_t \ldots o_M)$, which is the probability of a previous state of an agent when given present and future observations provided from logged data and/or simulated data. Moreover, the training module 270 can further update the generated probability of the previous state using $P(o_{t-1}|s_{t-1})$ by Bayes' rule to compute $P(s_{t-1}|o_{t-1} \ldots o_M) \propto P(s_{t-1}|o_{t-1} \ldots o_M) P(o_{t-1}|s_{t-1})$, which represents a prediction of a previous state when provided a next state and future observations. In one embodiment, the training module 270 implements sequential Monte Carlo techniques to generate the prediction of the previous state. Moreover, the training module 270, in one embodiment, employs a similar approach to compute state and action distributions. In this way, the training module 270 generates backwards updates using the provided data to update predictions once further observations are available.

In still further aspects, the training module 270 applies both forward and backward estimations to learn behaviors of the dynamic agents through forward updates and backward updates. That is, the training module 270, in one embodiment, trains the model 260 by computing $P(s_{t+1}|o_{t+1} \ldots o_M)$, $P(s_{t-1}|o_1 \ldots o_{t-1})$, using the forward and backward approaches previously described to generate estimations of states and/or actions when provided at least with a set of observations.

Additionally, the training module 270, in one embodiment, computes update probabilities for successive time steps using the probability of future and past states given future and past observations as provided, $P(s_{t+1}|o_{t+1} \ldots o_M)$, $P(s_{t-1}|o_1 \ldots o_{t-1})$, and the action distributions and transition distributions, $P_Q(a_{t-1}|s_{t-1})$, $P_T(s^t|a_{t-1}, s_{t-1})$, according to:

$$P(s^t|o_1, \ldots, o_M) \propto \int s_{t+1} \int s_{t-1} P(o_t|s_t) P(s_t|s_{t+1}, s_{t-1}) \\ P(s_{t+1}|o_{t+1} \ldots o_M) P(s_{t-1}|o_1 \ldots o_{t-1}) \quad (8)$$

The training module 270 computes the updated probabilities by, for example, marginalizing over directly preceding and following states, and then factoring in likelihoods for the current observation. The training module 270 predicts the states given the observations. Additionally, the training module 270, in one embodiment, obtains $P(s_t|s_{t+1}, s_{t-1})$ by marginalizing over actions, $$P(s_t|s_{t+1}, s_{t-1}) = \\ \frac{1}{p(s_{t+1})} P(s_t, s_{t+1}|, s_{t-1}) = \frac{1}{p(s_{t+1})} P(s_{t+1}|, s_t) P(s_t|, s_{t-1}),$$

which can be obtained using the agent model and transition model. For example, the training module 270 can compute the probabilities using Metropolis-Hastings, Gibbs sampling, or another similar approach. Accordingly, the training module 270 uses the noted approach, in one embodiment, to provide a distribution of state trajectories given the model 260 and observations. In further aspects, the training module 270 applies similar processes to generate a distribution of state and action trajectories given the observations. Similarly, the training module can provide state and action distributions using the noted approach. The following provides pseudocode of one such approach.

While the above-noted approaches can be used in isolation to train the model 260, the noted approaches may also be used in combination. Moreover, further approaches can also be applied either in isolation or in combination to train on further features such as latent agents. That is, in one approach, the training module 270 trains the model 260 to predict the presence of latent/unseen agents in the surrounding environment according to observations of other agents. For example, the training module 270 uses the forward and backward updates as previously discussed to train the model 260 on the latent agents. By way of example, the following pseudocode, as may be implemented by the training module 270, indicates a general process for training the model 260 to provide a probability of the presence of latent agents that are, for example, influencing the behavior of observed agents. Accordingly, the probability for the presence of the latent agents is generally conditioned on observations of the observed agents embodying behaviors of the observed agents.

```
1: for Iteration i = 1, 2, ... do
2:     Update estimate of s_t, a_t using sequential Monte-Carlo, using the
       forward-backward updates.
3: Sample φ, including imputation if needed, using existing model 260
(e.g., agent model or transition model).
4:     Using samples of (s_t, a_t) trajectories, update model 260 using
either
       Apprenticeship Learning or Imitation learning.
5: end for
```

Similarly, the training module 270 can employ the noted approach to train on state and action distributions. In this way, the prediction system 170 generates the model 260 in a robust manner such that the tracking module 230 can apply the model 260 to observations in various contexts to make predictions about dynamic aspects of agents from which autonomous controls of the vehicle 100 can be informed.

By way of example, the training module 270 can train the model 260 from driving data, using the latent training approach to generate the model 260 as a predictive model for vehicles, bicycles, trucks, pedestrians, etc. and that functions according to acquired data about surroundings of an ego vehicle (e.g., the vehicle 100). Moreover, the tracking module 230 can employ tracklets along a route as an input to the model 260, to generate estimates of states and actions. Subsequently, the state and action trajectories are used to update the agent model estimate Q.

Additionally, in one approach and as briefly outlined in FIG. 3, the model 260 can provide for tracking dynamic agents through the use of sub-models such as with an agent model trained according to the noted learning approaches of the prediction system 170. The agent model and the transition model, as well as a sensor-facing observation model, are subcomponents of the model 260 employed to estimate state updates from previous state estimates, allowing more accurate tracking of agents based on learned behaviors of the agents.

As a further example, the tracking module 230 can use an observed agent to infer unseen properties of the surrounding environment such as the presence of other dynamic agents (e.g., pedestrians, other vehicles) or static aspects (e.g., traffic signs, etc.) that influence behaviors of the dynamic agents. In general, the prediction system 170 achieves this functionality by conditioning the model 260 on the existence of the unseen properties in the probabilities of the modeled states. One example includes the training module 270 conditioning/training the model 260 on the existence of an unseen (dynamic) obstacle/agent (Obs1), hidden by another agent/obstacle (Obs2). The training module 270 then uses the model 260 to infer from the behavior of Obs2 or other agents in the area, the existence of Obs1, or a trajectory associated with Obs1. Examples of latent agents include hidden traffic lights, interacting cars, and other aspects of the environment that influence behaviors of tertiary agents.

As a further example, the prediction system 170, in one embodiment, further trains the model 260 and employs the tracking module 230 to track or otherwise infer the presence of unseen objects, such as a child following a ball where the child is occluded by a nearby vehicle or other object. Further examples can include a car stopping for an unseen obstacle, unseen traffic light states for predicting other vehicle states and movements of an ego vehicle, and so on. This configuration is distinct from the prior example in that the ball is observed and is passive, but the system 170 samples the existence of an agent following the ball to provide an indication about whether the unseen object is actually present. Furthermore, the prediction system 170, in one embodiment, trains the model 260 to learn localized behavior patterns associated with particular features of a feature map and/or coordinates so that the tracking module 230 can adjust determinations according to particular locations (e.g., likelihood of latent agents (e.g., children) in a school zone or near a park). In one aspect, the prediction system 170 performs active learning (i.e., training of the model 260) by selectively collecting information about observed circumstances and then using the collected information to train the model 260. For example, in one approach, the prediction system 170 uses the model 260 to determine which data is to be collected for training according to indications by the model 260 that particular data relates to latent aspects of the environment or is otherwise significant. Moreover, the prediction system 170, in one embodiment, triggers collection of information from the vehicle 100 or a fleet of vehicles by computing mutual information between new observations and the model 260. In this way, the prediction system 170 selectively collects information to actively train the model 260 about various aspects of the surrounding environment including latent agents and other relevant aspects.

Figure 4:
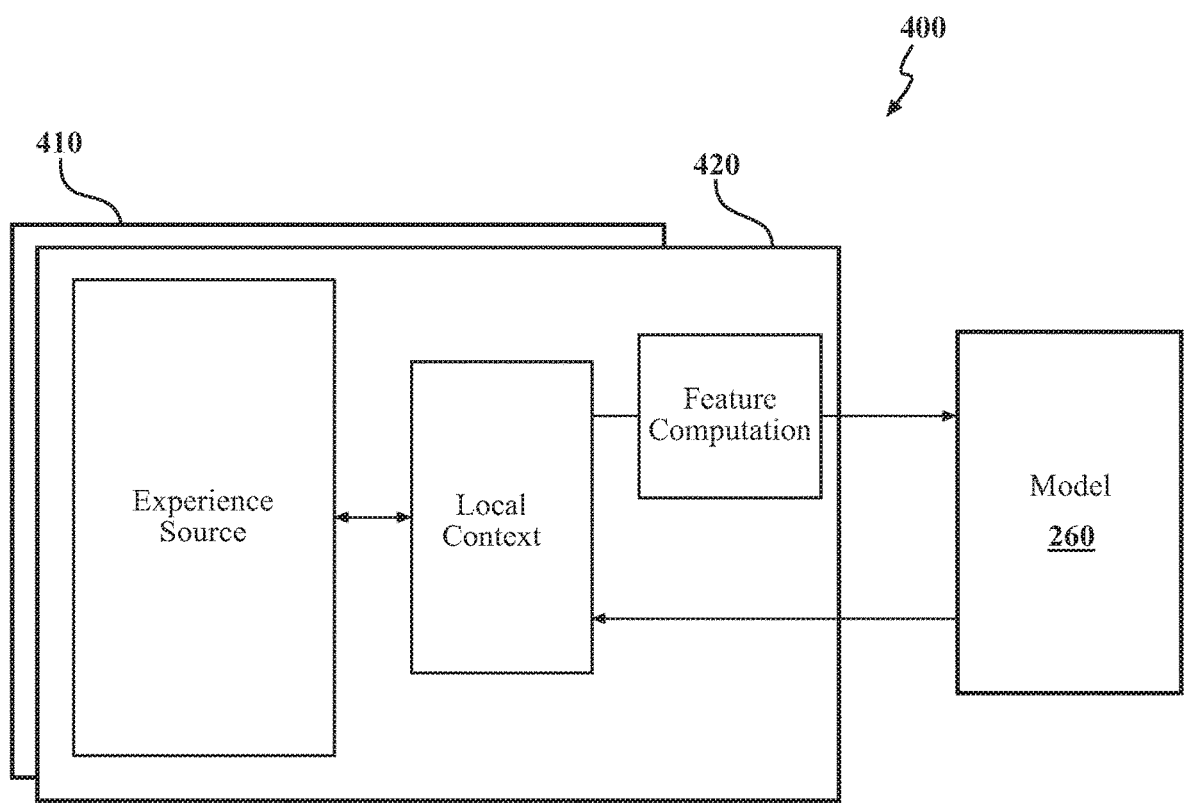
FIG. 4 illustrates a plate diagram associated with different data sources for training the model.

With further reference to FIG. 4, additional aspects are illustrated relating to selection of information for training. That is, as previously mentioned, the prediction system 170, in one embodiment, trains the model 260 from multiple data sources (logged datasets, vehicles actively on the road, simulated data, etc.) at the same time. The plate diagram 400 as illustrated in FIG. 4 indicates this combined use of information. For example, the plate 410 and the plate 420 represent different experience sources. By way of example, source plate 410 is real data acquired from vehicles traveling along roads and logging sensor data about perceived aspects of the environment. By contrast, the source 420 is simulated data that is computer-generated by, for example, the model 260 or another model that produces simulated observations used for learning and/or validation.

In further aspects, the source plate 410 includes examples of how an autonomous or at least semi-autonomous vehicle drives, whereas the source plate 420 includes examples of how other observed vehicles/agents on the road drive/maneuver. Thus, the source plate 410 can be leveraged to learn from driving styles of others, and to predict how other vehicles on the road react to various contexts. Moreover, the data sources are not necessarily limited to vehicles but can also include multiple other data sources such as infrastructure sources (e.g., traffic cameras), vehicle fleet sourced information, and simulated data from a perspective of a vehicle or another source viewing a general driving scene (e.g., intersection, road environment, etc.). Accordingly, while the plate diagram 400 is shown as including two distinct sources according to how the data itself is generated, in various embodiments, the data sources from which the model 260 is trained and that are used to generate predictions for tracking can vary according to contextual characteristics in addition to the originating source.

In either case, the distinct sources of training data serve to, for example, improve the robust nature of the model 260 by enriching an overall experience source of the model 260. By way of example, in one instantiation, the prediction system 170 trains the model 260 via highly-parallel GPU deep reinforcement learning using the various data sources as separate streams. In another instantiation, the experience sources are distributed on multiple machines, or simulation computer servers embodied as, for example, a car fleet such that the prediction system 170 trains the model 260 in-parallel according to the different sources. As a further example, a case of interest is joining several data sources, with the same features, but with different observation/emission models for these features. For example, the data sources can include agent vehicle observations, ego vehicle data, and simulated data logs. Incorporating the simulated information alongside the real-world collected data provides for improving on data that covers rare or non-existing circumstances in the real-world data thereby improving the overall training.

Figure 5:
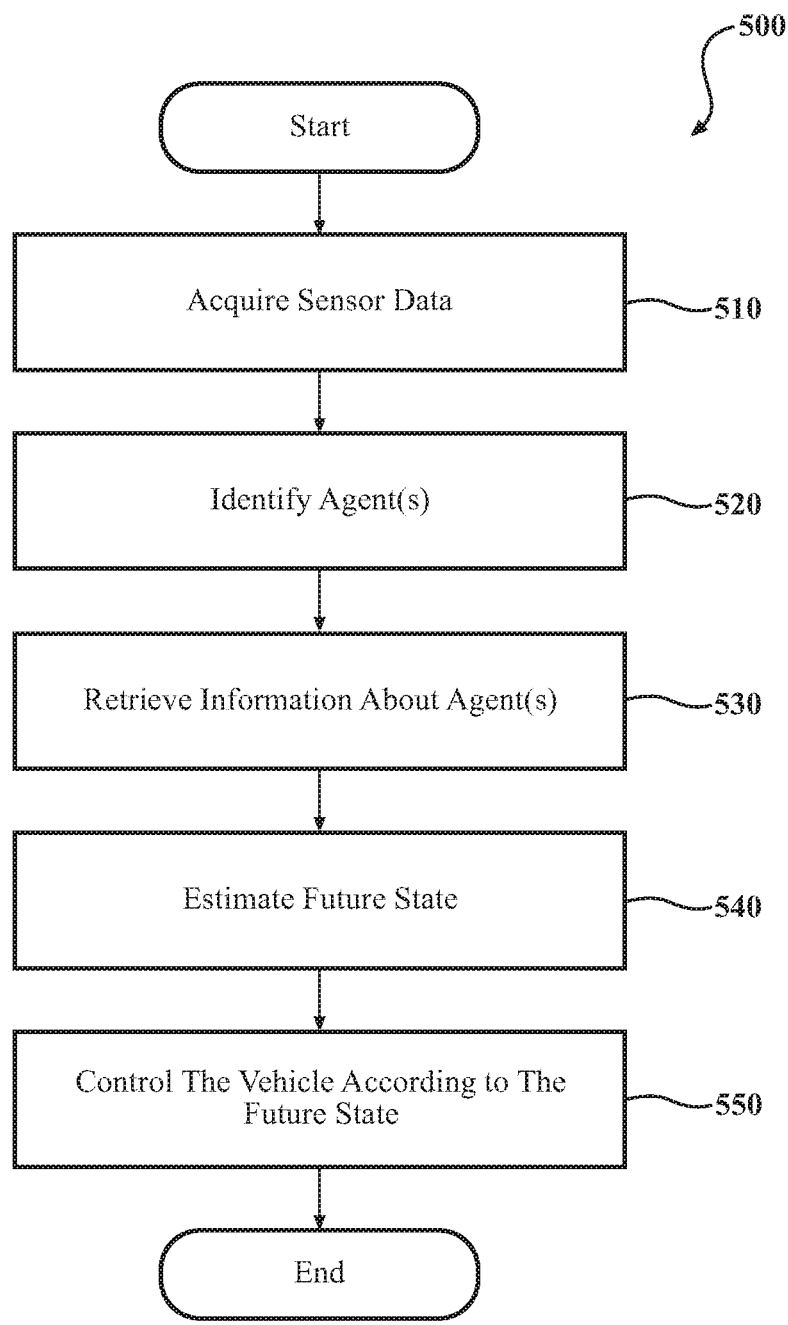
FIG. 5 illustrates one embodiment of a method associated with estimating a future state of a road agent.

Additional aspects of predicting future states of dynamic agents using a model and training the model will be discussed in relation to FIG. 5. FIG. 5 illustrates a flowchart of a method 500 that is associated with autonomously controlling a vehicle according to state predictions generated according to the disclosed model. Method 500 will be discussed from the perspective of the prediction system 170 of FIGS. 1, and 2. While method 500 is discussed in combination with the prediction system 170, it should be appreciated that the method 500 is not limited to being implemented within the prediction system 170, but is instead one example of a system that may implement the method 500.

At 510, the input module 220 controls one or more sensors of the sensor system 120 of the vehicle 100 to observe the surrounding environment. As part of controlling the sensors to acquire the sensor data 250, it is generally understood that the sensors acquire the sensor data 250 of a same region within the surrounding environment so that the sensor data 250 includes overlapping fields of view between the various sensors. Thus, in one embodiment, the input module 220 fuses the sensor data 250 from the various sensors in order to generate combined perceptions of the surrounding environment. The perceptions generally include observations of dynamic agents that are proximate to the vehicle 100 and are thus relevant to planning and control of the vehicle 100. In either case, the acquired sensor data 250 can be transformed into higher level perceptions of the surrounding environment in order to provide observations of discrete agents and associated characteristics for analysis.

Furthermore, in one embodiment, the input module 220 controls the sensors to acquire the sensor data 250 of the same area, or alternatively selectively acquires the sensor data 250 from a data stream. Moreover, in further embodiments, the input module 220 controls the sensors to at least semi-continuously acquire the sensor data 250 such that successive iterations of the discussed process may be undertaken. Thus, the prediction system 170, in one embodiment, iteratively executes the functions discussed at blocks 510-550 to acquire the sensor data 250 and provide information therefrom. Furthermore, the input module 220, in one embodiment, executes one or more of the noted functions in-parallel for separate observations in order to maintain updated perceptions.

At 520, the input module 220, in response to receiving the sensor data 250 including present observations of at least one road agent of dynamic agents that are being tracked in the surrounding environment, identifies previous observations of the road agent. That is, for example, the input module 230 correlates the road agent with previous observations to maintain continuity in understanding of the surrounding environment. In this way, the road agent can be continuously tracked, and estimates of future states provided accordingly.

At 530, the input module 220 retrieves the previous observations from an electronic data store (e.g., memory 210). In one embodiment, the previous observations are maintained in memory, and thus the input module 220 may simply link the observations to create the noted correlation. As a further note, while the input module 220 is discussed as identifying and retrieving observations, in further aspects, the input module 220 may also track and manage further aspects about information relating to the dynamic agents such as actions, states, and so on.

At 540, the tracking module 230 estimates a future state of the road agent using at least the present observations and the previous observations of the road agent. In one embodiment, the tracking module 230 computes the future state (e.g., state at time t+1) according to the model 260. It should be appreciated, that the model 260, as previously described in greater detail, is formed according to a Markov Decision Process or partially observable MDP. Moreover, the model 260 is comprised of a transition model that accounts for dynamic behaviors of the road agent to characterize transitions between states, and an agent model that accounts for actions of the road agent as further illustrated in FIG. 3.

As further explanation about how the tracking module 230 generates the future state from the observations, in one embodiment, the tracking module 230 computes the future state (e.g., forward update) according to the previous observations and the present observations, and then further refines the future state by incorporating observations (e.g., predicted observations) that approximate future observations. In general, the tracking module 230 can implement sequential Monte Carlo algorithm in combination with the model 260 to generate the future state from, for example, a previous state, the present observations and the previous observations.

In still further aspects, the tracking module 230 determines through, for example, an initial computation that the road agent is likely associated with a latent agent and thus predicts a presence of the latent agent using the model 260 or a portion thereof that has been trained on latent agents. As previously explained, the model 260 can be trained on a wide range of information including information that conditions the model 260 for detecting the presence of latent agents (i.e., unseen agents). Thus, when observations of one or more dynamic agents are indicative of the presence of a latent agent, the tracking module 230 indicates the probability of the presence of the unseen object. In this way, the tracking module 230 in combination with the model 260 provide for improved predictions about the observed, partially observed, and latent agents in the surrounding environment.

At 550, the tracking module 230 controls one or more of the vehicle systems 140 of the ego vehicle 100 according to the future state of the road agent. That is, in one embodiment, the tracking module 230 causes various controls (e.g., steering, accelerating, etc.) to be executed through providing the determinations about the future state. For example, the tracking module 230 can function in combination with the autonomous driving module 160 to plan, and execute controls for maneuvering the vehicle 100 according to the dynamic agents and predicted future states, actions, and so on related to the agents.

As further examples of how the prediction system 170 generates the estimates consider the following contextual examples.

By way of example, consider a circumstance where ado-car T1 (e.g., nearby vehicle/agent) is traveling on a roadway with a slower car T2 in front of T1. The tracking module 230 predicts whether T1 is likely to pass T2 by changing a lane before approaching too closely to T2. In general, since we normalize with respect to a pose of the vehicle relevant features include speeds, relative speeds, legal speed, and lane positions. The training module 270 trains the model 260 using, for example, imitation learning through updates with respect to available features (i.e., sensor data/observations of the noted features), and sampling based on noisy features (i.e. sampling positions that are observed). Thereafter, the tracking module 230 acquires similar information in real-time from sensors of the vehicle 100 to predict whether vehicle T1 will pass and thereby produce the estimate to inform maneuvers of the vehicle 100.

In a further example, consider the presence of a traffic light, and a car that is occluding the traffic light. Further consider the previous circumstance of T1 and T2. Thus, in such a circumstance, the tracking module 230 infers the presence of the status of the traffic light, and consequently, determines not to pass T2 since the light is the cause of the behaviors of T2. In general, features (i.e., observations) employed by the prediction system 170 for training and predicting on this circumstance include speeds, relative speeds, legal speed, lane positions, as well as the state of the traffic light. The state of the traffic light may be acquired through various means such as prediction or direct observation.

Figure 6:
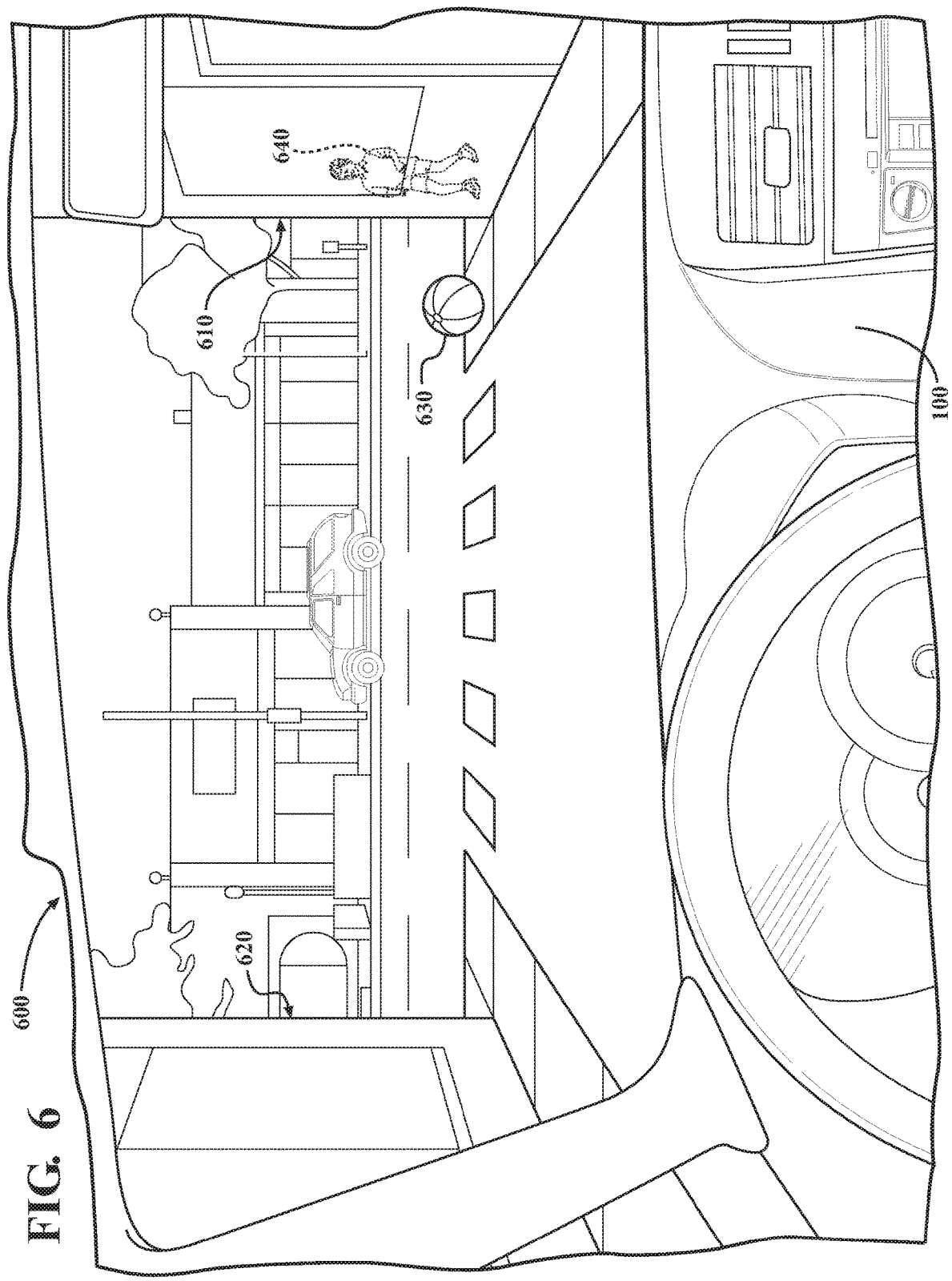
FIG. 6 illustrates one example of predicting aspects relating to a latent agent from observations of a road agent.

As a further explanation, FIG. 6 illustrates an example driving scene 600 that may be encountered by the vehicle 100. In the present example, the input module 220 acquires observations of the surrounding environment including buildings 610 and 620, and the movement of the ball 630 toward the illustrated intersection. Thus, in one embodiment, the tracking module 230 acquires the observations of the ball 630 over a period of time and in relation to the occlusion of the building 610. The tracking module 230, using the past observations of the movement of the ball 630 along with at least the present observations, applies the model 260 to the observations to estimate the future state. In this instance, as part of producing the future state, the tracking module 230 recognizes the context of the occlusion and the ball, and because the model 260 has been previously conditioned on the detection of latent agents such as the child 640, the tracking module 230 provide an output indicating a probability of the presence of the child 640. In this way, the tracking module 230 can provide predictions about latent agents from observations of visible agents.

Moreover, as the scene depicted in FIG. 6 progresses and the vehicle 100 eventually directly observes the child 640, the input module 220 can store the subsequent observations that include the child 640 such that the training module 270 can provide backwards updates that verify and/or correct previous predictions about the presence of the child 640. In this way, the training module 270 facilitates the model 260 to learn about the latent aspects of the environment so that predictions are improved on subsequent observations.

Figure 7:
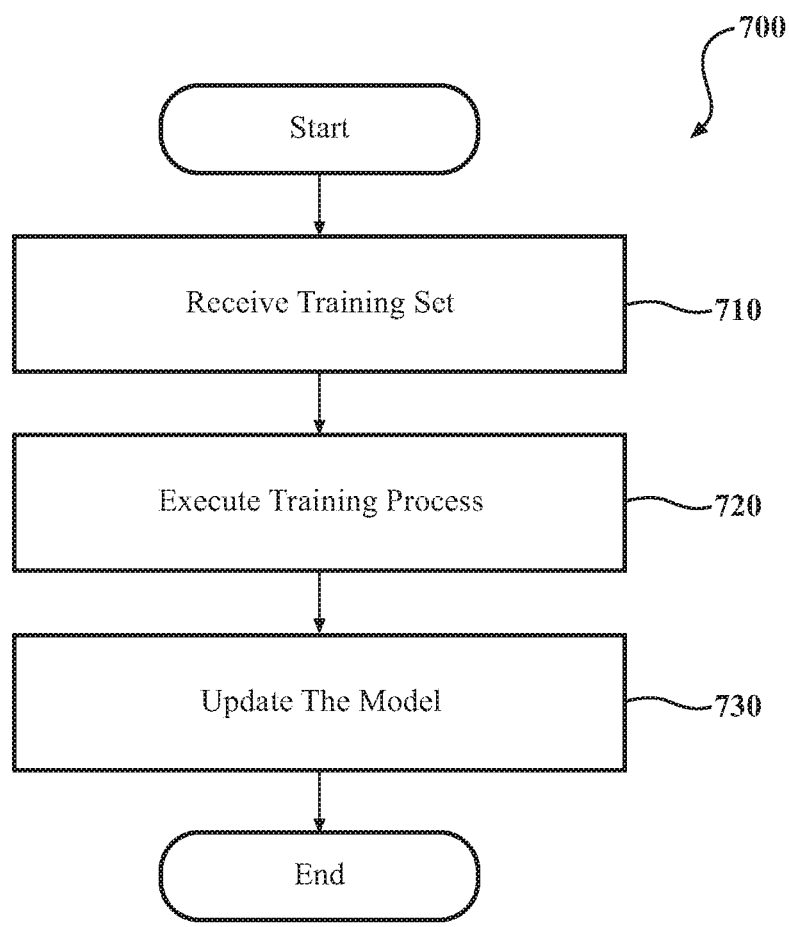
FIG. 7 illustrates one embodiment of a method associated with training the model described herein.

The discussion will now turn to the training of the model 260. FIG. 7 illustrates a flowchart of a method 700 that is associated with training a model for tracking dynamic road agents. Method 700 will be discussed from the perspective of the prediction system 170 of FIGS. 1, and 2. While method 700 is discussed in combination with the prediction system 170, it should be appreciated that the method 700 is not limited to being implemented within the prediction system 170, but is instead one example of a system that may implement the method 700. As a further matter, while the training of the model 260 is discussed as a wholly local process, in one embodiment, the prediction system 170 is a distributed system that executes training of the model 260 across multiple computing platforms and in-parallel using various training data sets. Accordingly, the prediction system 170 is illustrated as a single computing device in order to facilitate the present discussion but may be provided in various distributed forms.

At 710, the training module 270 acquires one or more sources of data for training the model 260. As previously explained in relation to FIG. 4, the logged data includes past observations from one or more vehicles that have logged observations, and/or simulated data that is computer-generated. In one embodiment, the simulated data is generated using the model 260 and/or another simulation system (e.g., generative neural network). In either case, the training data is collected to acquire a set of training examples having a sufficient quantity, quality, and diversity that the process of training the model 260 produces understandings within the model 260 that can be extrapolated into accurate predictions of future states using present and past observations of agents.

At 720, the training module 270 trains the model 260 using one or more of the logged data and the simulated data. In one embodiment, the training module 270 trains the model 260 using reinforcement learning to generate backwards updates of the agent model. For example, the training module 270 computes a prior probability of a previously given state of the road agent at a previous point in time according to the previous observations and the present observations. In this way, the training module 270 can improve on the previous determinations through the perspective of hindsight to update the prior probability by computing a refined probability according to a determined next state and future observations of the road agent.

Moreover, in further embodiments, the training module 270 generates the backwards updates along with forward updates that predict the future state, as previously specified. In general, the training module 270 generates the backwards updates and the forward updates using the probability of future and past states given future and past observations, and action distributions and transition distributions for separate times to update a probability of a current state.

In still further aspects, the training module 270 trains the model 260 to model one or more latent agents. The training module 270 can train for the latent agents by i) sampling updated states and action trajectories to provide samples, ii) updating the agent model and the transition model according to the samples, and iii) iteratively executing the sampling and the updating of the agent model and the transition model until the agent model and the transition model converge.

At 730, once generated, the training module 270 applies the updated states to the model 260 to integrate the newly learned information. In this way, the training module 270 trains the model 260 on various scenarios using varying levels of observable data. As such, the prediction system 170 provides for predicting aspects relating to latent/unseen influences in the surrounding environment as well as aspects relating to only partially observed agents.

FIG. 1 will now be discussed in full detail as an example environment within which the system and methods disclosed herein may operate. While the discussion of FIG. 1 is focused on a vehicle, it should be appreciated that one or more aspects as disclosed herein can be performed in a cloud-computing environment or other computing environment that is separate from a vehicle. In either case, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles and other agents).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the prediction system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the prediction system 170, and/or the autonomous driving module(s) 160 may control some or all of these vehicle systems 140 and, thus, may be partially or fully autonomous.

The processor(s) 110, the prediction system 170, and/or the autonomous driving module(s) 160 can be operatively connected to communicate with the various vehicle systems 140 and/or individual components thereof. For example, returning to FIG. 1, the processor(s) 110, the prediction system 170, and/or the autonomous driving module(s) 160 can be in communication to send and/or receive information from the various vehicle systems 140 to control the movement, speed, maneuvering, heading, direction, etc. of the vehicle 100. The processor(s) 110, the prediction system 170, and/or the autonomous driving module(s) 160 may control some or all of these vehicle systems 140.

The processor(s) 110, the prediction system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the prediction system 170, and/or the autonomous driving module(s) 160 can control the direction and/or speed of the vehicle 100. The processor(s) 110, the prediction system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the tracking module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system for modeling dynamic agents in a surrounding environment of an ego vehicle, comprising:
   one or more processors;
   a memory communicably coupled to the one or more processors and storing:
   an input module including instructions that when executed by the one or more processors cause the one or more processors to, in response to receiving sensor data including present observations of a road agent of the dynamic agents that are being tracked in the surrounding environment, identify previous observations of the road agent from an electronic data store; and
   a tracking module including instructions that when executed by the one or more processors cause the one or more processors to predict a presence of a latent agent using a probabilistic model and at least the present observations of the road agent, and to estimate a future state of the road agent using at least the present observations, the presence of the latent agent, and the previous observations of the road agent to compute the future state according to the probabilistic model that is comprised of a transition model that accounts for dynamic behaviors of the road agent to characterize transitions between states, and an agent model that accounts for actions of the road agent, wherein the present observations indicate at least a partial observation of the road agent, and
   wherein the tracking module includes instructions to control one or more vehicle systems of the ego vehicle according to the future state of the road agent.

2. The prediction system of claim 1, wherein the tracking module further includes instructions to predict the presence of the latent agent in response to determining that the road agent is likely associated with the latent agent, wherein the latent agent is an unobserved aspect of the surrounding environment, wherein the sensor data includes information from multiple different sensors of the ego vehicle, and wherein the action is one or more of steering the ego vehicle and accelerating the ego vehicle.

3. The prediction system of claim 2, wherein the unobserved aspect is an unseen agent that influences behaviors of the road agent.

4. The prediction system of claim 1, wherein the tracking module includes instructions to estimate the future state of the road agent including instructions to compute the future state according to the previous observations and the present observations, and to refine the future state according to incorporation of observations to approximate future observations, and
   wherein the tracking module includes instructions to estimate the future state including instructions to apply a sequential Monte Carlo algorithm to a previous state, the present observations and the previous observations to produce the future state.

5. The prediction system of claim 1, further comprising:
   a training module including instructions that when executed by the one or more processors cause the one or more processors to train the probabilistic model using one or more of logged data and simulated data, wherein the logged data includes past observations from one or more logging vehicles, and wherein the simulated data is computer-generated based, at least in part, on the probabilistic model.

6. The prediction system of claim 5, wherein the training module includes instructions to train the probabilistic model including instructions to train using reinforcement learning to generate backwards updates of the agent model by computing a prior probability of a previous given state of the road agent at a previous point in time according to the previous observations and the present observations, and wherein the training module includes instructions to train the probabilistic model further including instructions to update the prior probability by computing a refined probability according to a determined next state and future observations of the road agent.

7. The prediction system of claim 6, wherein the training module includes instructions to train the probabilistic model including instructions to generate the backwards updates along with forward updates including generating the future state using the probabilistic model as the forward updates, and wherein the training module includes instructions to generate the backwards updates and the forward updates including instructions to use probabilities of future states and past states, future observations and past observations, and action distributions and transition distributions to compute an updated probability of a current state at successive time steps.

8. The prediction system of claim 5, wherein the training module includes instructions to train the probabilistic model including instructions to model one or more latent agents of the dynamic agents by i) sampling updated states and action trajectories to provide samples, ii) updating the agent model and the transition model according to the samples, and iii) iteratively executing the sampling and the updating of the agent model and the transition model until the agent model and the transition model converge.

9. A non-transitory computer-readable medium for modeling dynamic agents in a surrounding environment of an ego vehicle and including instructions that when executed by one or more processors cause the one or more processors to:

in response to receiving sensor data including present observations of a road agent of the dynamic agents that are being tracked in the surrounding environment, identify previous observations of the road agent from an electronic data store;

predict a presence of a latent agent using a probabilistic model and at least the present observations of the road agent;

estimate a future state of the road agent using at least the present observations, the presence of the latent agent, and the previous observations of the road agent to compute the future state according to the probabilistic model that is comprised of a transition model that accounts for dynamic behaviors of the road agent to characterize transitions between states, and an agent model that accounts for actions of the road agent, wherein the present observations indicate at least a partial observation of the road agent; and control one or more vehicle systems of the ego vehicle according to the future state of the road agent.

10. The non-transitory computer-readable medium of claim 9, wherein the instructions to estimate the future state include instructions to wherein the latent agent is an unobserved aspect of the surrounding environment, wherein the sensor data includes information from multiple different sensors of the ego vehicle, and wherein the action is one or more of steering the ego vehicle and accelerating the ego vehicle.

11. The non-transitory computer-readable medium of claim 9, wherein the instructions to estimate the future state of the road agent include instructions to compute the future state according to the previous observations and the present observations, and to refine the future state according to incorporation of observations to approximate future observations, and wherein the instructions to estimate the future state include instructions to apply a sequential Monte Carlo algorithm to a previous state, the present observations and the previous observations to produce the future state.

12. The non-transitory computer-readable medium of claim 9, further comprising:

instructions that when executed by the one or more processors cause the one or more processors to train the probabilistic model using one or more of logged data and simulated data, wherein the logged data includes past observations from one or more logging vehicles, and wherein the simulated data is computer-generated based, at least in part, on the probabilistic model.

13. The non-transitory computer-readable medium of claim 12, wherein the instructions to train the probabilistic model include instructions to train using reinforcement learning to generate backwards updates of the agent model by computing a prior probability of a previous given state of the road agent at a previous point in time according to the previous observations and the present observations, and wherein the instructions to train the probabilistic model further include instructions to update the prior probability by computing a refined probability according to a determined next state and future observations of the road agent.

14. A method of modeling dynamic agents in a surrounding environment of an ego vehicle, comprising:

in response to receiving sensor data including present observations of a road agent of the dynamic agents that are being tracked in the surrounding environment, identifying previous observations of the road agent from an electronic data store;

predicting a presence of a latent agent using a probabilistic model and at least the present observations of the road agent;

estimating a future state of the road agent using at least the present observations, the presence of the latent agent, and the previous observations of the road agent to compute the future state according to the probabilistic model that is comprised of a transition model that accounts for dynamic behaviors of the road agent to characterize transitions between states, and an agent model that accounts for actions of the road agent, and wherein the present observations indicate at least a partial observation of the road agent; and controlling one or more vehicle systems of the ego vehicle according to the future state of the road agent.

15. The method of claim 14, wherein predicting the presence of the latent agent is in response to determining that the road agent is likely associated with the latent agent, wherein the latent agent is an unobserved aspect of the surrounding environment, wherein the sensor data includes information from multiple different sensors of the ego vehicle, and wherein the action is one or more of steering the ego vehicle and accelerating the ego vehicle.

16. The method of claim 14, wherein estimating the future state of the road agent includes computing the future state according to the previous observations and the present observations, and refining the future state according to incorporation of observations to approximate future observations, and wherein estimating the future state includes applying a sequential Monte Carlo algorithm to a previous state, the present observations and the previous observations to produce the future state.

17. The method of claim 14, further comprising:

training the probabilistic model using one or more of logged data and simulated data, wherein the logged data includes past observations from one or more logging vehicles, wherein the simulated data is computer-generated based, at least in part, on the probabilistic model.

18. The method of claim 17, wherein training the probabilistic model includes using reinforcement learning to generate backwards updates of the agent model by computing a prior probability of a previous given state of the road agent at a previous point in time according to the previous observations and the present observations, and wherein training the probabilistic model further includes updating the prior probability by computing a refined probability according to a determined next state and future observations of the road agent.

19. The method of claim 18, wherein training the probabilistic model includes generating the backwards updates along with forward updates, wherein generating the forward updates includes generating the future state using the probabilistic model, and wherein generating the backwards updates and the forward updates includes using the probability of future and past states given future and past observations, and action distributions and transition distributions to compute for separate times an updated probability of a current state.

20. The method of claim 17, wherein training the probabilistic model includes modeling one or more latent agents of the dynamic agents by i) sampling updated states and action trajectories to provide samples, ii) updating the agent model and the transition model according to the samples, and iii) iteratively executing the sampling and the updating of the agent model and the transition model until the agent model and the transition model converge.

* * * * *